July 28, 1942.  C. GILMAN  2,291,548
TEMPERATURE CONTROL BATTERY BOX
Filed Jan. 12, 1940
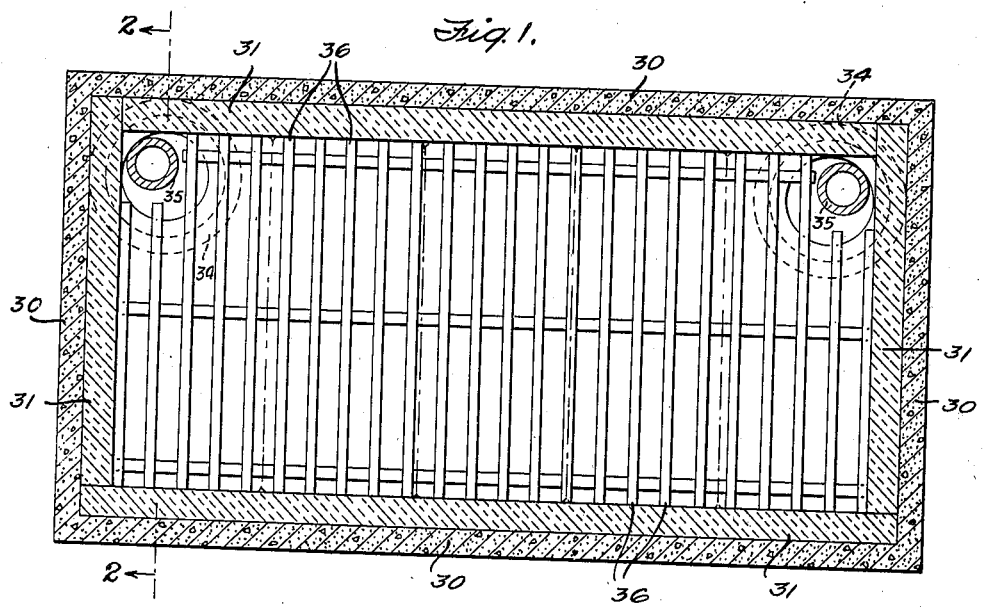
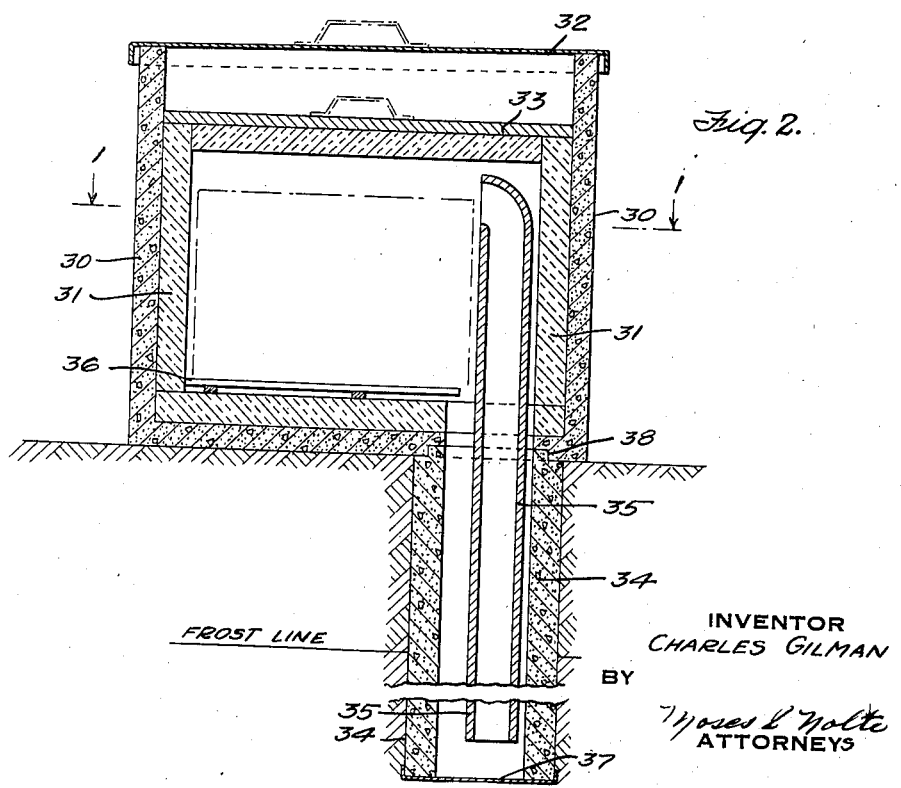
INVENTOR
CHARLES GILMAN
BY
Moses & Nolte
ATTORNEYS Patented July 28, 1942

2,291,548

UNITED STATES PATENT OFFICE 2,291,548

TEMPERATURE CONTROL BATTERY BOX

Charles Gilman, Plainfield, N. J.

Application January 12, 1940, Serial No. 313,501

1 Claim. (Cl. 72—11)

This invention relates to storage containers for outdoor use, particularly containers for railway signal and track circuit batteries which must be kept in the open in close proximity to the energized mechanism.

Battery boxes, particularly of concrete, are an extensively used railroad equipment. The batteries contained therein, however, if exposed to low temperatures often fail because of loss of efficiency or freezing. It has therefore previously been proposed to bury the boxes with the batteries therein below the surface of the ground. While this system avoids freezing, it is necessary in order to have sufficiently strong containers for the battery and to withstand seepage and the pressure of earth, to build rather massive concrete boxes or wells which in most cases present a problem of handling and ordinarily can only be placed in position with the aid of a powerful crane. Furthermore a considerable excavation is necessary.

It is an object of this invention to provide a battery box which may be positioned on the surface of the ground, but which will protect the battery against exposure to dangerously low temperatures. This is accomplished by utilizing the natural warmth of the earth below the frost line to prevent the existence of cold in the box sufficient to damage the batteries.

A further object of the invention is to provide a battery box with a flue system for conducting warm air from below the frost line of the earth into the storage area of the box to keep the temperature therein within the efficiency range of the batteries.

Other objects and advantages will appear in the following specification wherein:

Figure 1 is a horizontal section taken on the line 1—1 of Fig. 2 looking in the direction of the arrows showing a preferred embodiment of the invention; and Figure 2 is a transverse vertical sectional view taken on the line 2—2 of Fig. 1.

Referring to the drawing in detail, the battery box shown comprises a concrete shell 30 having covers 32 of steel or other suitable material which may be suitably supported by the tops of the side walls. The interior of the box is covered on the bottom and sides with heat insulating material 31, and the top is supplied with frost covers 33, also of insulating material. The bottom of the box is provided with grids 36 upon which the batteries rest, and which permit free circulation beneath and around the batteries.

Descending into the ground from the bottom of the box proper are the pipes 34 which may suitably be of concrete or other durable material and which are buried to a point below the frost line as shown, and terminate at the bottom in copper or other metal covering plates 37 which rest firmly against the earth at the bottom of the hole dug for the purpose. The plate 37 may be formed as a cap having an upturned flange at its edge and may suitably be sealed on the bottom of the pipe 34 and serve to prevent entrance of moisture. The hole for the pipe 34 may of course be considerably smaller than would be required for the reception of the entire battery box or a battery well and in most circumstances will be drilled with an earth augur. The pipe or vent 34 is preferably of relatively substantial diameter and contains within itself a draft pipe 35 of less diameter, which extends from a point near the top of the storage space downwardly to within a short distance of the plate 37 leaving sufficient space for circulation of air beneath its lower extremity. The air circulation system may be conveniently situated in any portion of the box preferably without encroaching too seriously on the storage space itself. As shown, the system comprises two units situated in two corners where little sacrifice of space need be made. The cap 37 may be sealed to the bottom of the pipe 34 if desired, or may in instances be omitted.

It will be seen first that the natural heat within the battery box will be preserved to a very large extent by the all round insulation and that the temperature within the battery box will customarily be above that of the surrounding atmosphere outside of the box. The air circulation system, however, is a positive aid against chilling of the batteries and consequent breakdown of the signal system. It will be seen that air warmed by the surrounding earth particularly beneath the plate 37 will naturally rise through the center vent 35 and into the storage area, displacing cold air in the storage space which will travel down the pipe 34 around the vent 35 to the warm area near the plate 37. A constant supply of relatively warm air is thus kept circulating in the interior of the box and the batteries are thus maintained at a temperature to function properly. For ordinary weather conditions of course the insulation of the battery box will protect the contents from chilling and the small amount of heat supplied by the air circulation system will adequately protect the contents of the box in excessively cold weather.

I claim:

A box for the storage of batteries sensitive to extremes of temperature, on the surface of the earth, said box having a substantially unobstructed battery storage space and having a heat transference pipe open at its upper end extending downwardly from the bottom of the box into the earth to a point substantially below the frost line, a second pipe of smaller diameter mounted in said first mentioned pipe and extending downwardly to a point near the bottom of said first mentioned pipe and well below the frost line and extending upwardly to a point near the top of the storage space of said box said second mentioned pipe being open at both ends and a battery support raised from the floor of said box to permit the circulation of air throughout the box and about the batteries therein contained, there being free circulation of air from the bottom of the storage space down the larger pipe and up the smaller pipe into the upper part of the storage space.

CHARLES GILMAN.

CERTIFICATE OF CORRECTION.

Patent No. 2,291,548. July 28, 1942.

CHARLES GILMAN.

It is hereby certified that error appears in the printed specification of the above numbered patent requiring correction as follows: Page 1, second column, line 55, after the word and period "weather." insert the following paragraphs -

> --The pipe or pipes buried in the ground tend to act as a support or foundation for the box and, if desired, the box may be mounted entirely above the surface of the ground, or it may be partially or entirely buried below the surface of the ground.
>
> While the primary purpose of my invention is to prevent the chilling of batteries and the consequent disruption of signal service in very cold weather, it is nevertheless clear that the ventilation system will have its usefulness during summer weather when the temperature in the battery box may rise to a point at which the efficiency of the batteries will decline. Circulation of cool air from the ground will tend to prevent this difficulty.
>
> It will be understood that the battery box may either be made with the downward extending vent system an integral part thereof or as shown in Figure 2, the two may be separate and the air circulation pipe may be buried in the ground first with the box placed thereover, convenient sealing means between the box and the pipe being provided at 38 to prevent leakage of moisture into the box.
>
> While I have illustrated and described in detail a preferred form of my invention, it is to be understood that changes may be made therein and the invention embodied in other structures. I do not, therefore, desire to limit myself to the specific constructions illustrated, but intend to cover my invention broadly in whatever form its principle may be utilized. -- and that the said Letters Patent should be read with this correction therein that the same may conform to the record of the case in the Patent Office.

Signed and sealed this 8th day of September, A. D. 1942.

(Seal)

Henry Van Arsdale,
Acting Commissioner of Patents.